United States Patent
Singh et al.

(10) Patent No.: US 9,832,652 B1
(45) Date of Patent: Nov. 28, 2017

(54) METHODS AND SYSTEMS FOR MANAGING COVERAGE AREA CHANGES USING BASE STATION SIGNALING

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 356 days.

(21) Appl. No.: 14/078,188

(22) Filed: Nov. 12, 2013

(51) Int. Cl.
*H04W 36/00* (2009.01)
*H04W 16/12* (2009.01)

(52) U.S. Cl.
CPC .................................. *H04W 16/12* (2013.01)

(58) Field of Classification Search
CPC ..... H04W 28/00; H04W 16/08; H04W 36/22; H04W 28/08; H04L 47/125
See application file for complete search history.

(56) References Cited

U.S. PATENT DOCUMENTS

| | | | | |
|---|---|---|---|---|
| 8,521,168 B1* | 8/2013 | Sigg | ...................... | H04W 28/26 455/436 |
| 2002/0168983 A1* | 11/2002 | Kumaran | ............... | H04W 16/18 455/446 |
| 2007/0217433 A1* | 9/2007 | Doppler | ................... | H04B 7/02 370/400 |
| 2007/0275761 A1* | 11/2007 | Jin | ........................ | H04W 16/28 455/562.1 |
| 2008/0039089 A1* | 2/2008 | Berkman | ............... | H04W 36/04 455/436 |
| 2013/0331079 A1* | 12/2013 | Racz | ...................... | H04W 24/02 455/418 |
| 2014/0004862 A1* | 1/2014 | Ekemark | ............... | H04W 72/06 455/443 |
| 2014/0050135 A1* | 2/2014 | Zhang | ............... | H04W 52/0258 370/311 |
| 2014/0155081 A1* | 6/2014 | Nuss et al. | ..................... | 455/453 |
| 2015/0055517 A1* | 2/2015 | Samdanis et al. | ............ | 370/280 |

* cited by examiner

*Primary Examiner* — Shantell L Heiber

(57) ABSTRACT

Disclosed is a method and system for managing coverage area changes using base station signaling. The method may involve a first base station increasing the distance of coverage of the first base station on a first carrier frequency such that the extended coverage extends to a coverage area of a second base station on the first carrier frequency. The second base station may also be providing the coverage area on a second carrier frequency. The method may also involve causing one or more UEs being served by the second base station on the second frequency to prioritize operating on the first carrier frequency of the second base station over operating on the second carrier frequency of the second base station.

18 Claims, 4 Drawing Sheets

METHODS AND SYSTEMS FOR MANAGING COVERAGE AREA CHANGES USING BASE STATION SIGNALING

BACKGROUND

Unless otherwise indicated herein, the materials described in this section are not prior art to the claims and are not admitted to be prior art by inclusion in this section.

A typical cellular wireless network includes a radio access network (RAN) having a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handoff between coverage areas, and functions related to air interface communication.

In accordance with the air interface protocol, each coverage area may operate on one or more carrier frequencies and may define a number of air interface channels for carrying information between the base station and UEs. These channels may be defined in various ways, such as through frequency division multiplexing, time division multiplexing, and/or code-division multiplexing for instance.

More specifically, a UE may register with a coverage area of the cellular wireless network by transmitting a registration request or attach request to the base station serving that coverage area. Once registered, the UE may then operate in an idle mode in which the UE monitors a downlink control channel to receive overhead information and to check for any page messages. Upon receiving a page message, the UE may be assigned traffic channel resources on which the UE may engage in air interface communication.

Unfortunately, however, although a number of base stations of a cellular network may radiate to define a number of wireless coverage areas and thereby provide vast wireless coverage on various carrier frequencies, cellular wireless networks may still have operational limitations. Due to, for example, limitations of bandwidth, frequency allocations, base station placement, processing power, or other considerations, each cell coverage area in a given cellular network may only effectively serve a limited number of UEs.

For example, a reverse link air interface may become overwhelmed if too many UEs being served by the coverage area seek to send access probes at once. As another example, a RAN may not have available traffic channels to assign/reserve for the number of UEs attempting communication. Regardless of the reasons for the heavy loads in the wireless coverage area, ultimately, heavy loads may result in delayed call setup and blocked calls, which may translate into unacceptable user experience.

Accordingly, one challenge of providing an effective cellular wireless network may be arranging cell coverage areas to balance competing needs: coverage areas (e.g., cells and sectors) should preferably not regularly encompass so many users that they often reach capacity, but they should preferably not encompass so few users that their resources are underutilized.

OVERVIEW

To balance competing needs discussed above, a cellular wireless network may employ load balancing among various coverage areas being provided by the RAN. Load balancing may be performed by adjusting various RAN parameters that may include adjusting cell size and shape of coverage areas provided by the RAN and facilitating handovers of UEs being served by the RAN between the adjusted coverage areas, among other examples. For instance, in one embodiment a given coverage area in a RAN may be expanded to help balance traffic among available traffic channel resources in the RAN.

The given coverage area may be expanded by adjusting handover parameters, pilot power levels, antenna tilt, or various other RAN parameters. For instance, a base station radiating to define the given coverage area may use an antenna mechanism to change an azimuthal direction and/or elevation (i.e., tilt) of one or more antenna structures of the base station to expand the distance of coverage. In response, a UE operating in the RAN within the expanded distance of coverage may then take advantage of potentially available traffic channel resources in the RAN by operating in the expanded coverage area.

However, in some circumstances, expanding the distance of coverage of a given coverage area may not result in the available traffic resources being utilized by a UE operating in the RAN within the expanded distance of coverage. For example, instead of a particular UE operating in the expanded coverage area of the RAN, the UE may receive a pilot signal that suggests another coverage area, of which the UE is within distance, of the RAN is stronger than the expanded coverage area. Accordingly, the UE may transition to idle in the other coverage area instead of the expanded coverage area (i.e., the UE may engage in an idle handoff to the other coverage area) or if the UE is already operating in the coverage area with the stronger pilot signal, the UE may continue to operate in that coverage area thereby potentially leaving the traffic channel resources of the expanded coverage area underutilized.

In other examples, a base station in a RAN may be radiating to define a given coverage area that may be operating on two carrier frequencies. The base station may determine to expand the given coverage area on one of the two carrier frequencies, once again to help balance traffic among the available traffic channel resources in the RAN. However, similar to the example noted above, expanding coverage of the given coverage area on the one carrier frequency may not result in the available traffic channel resources being utilized.

For example, a UE operating in the RAN may not prefer to operate on the particular frequency on which the coverage area has been expanded (i.e., the carrier frequency that has the available traffic resources). Indeed, a UE may store priority data that may include a prioritized listing of carrier frequencies the UE may operate on. In practice, for a given cellular wireless network, the UE may register with the cellular wireless network in accordance with the carrier frequency priority data. Accordingly, a particular UE may not prefer the carrier frequency on which the distance of the coverage area has been expanded, but may instead prefer a different carrier frequency and may instead operate on that different carrier frequency.

Considering this, disclosed are methods and systems for managing coverage area changes, for example, where a first base station in a given RAN has expanded coverage area on a particular carrier frequency. Given that expanding the distance of a coverage area may not necessarily result in resources in the expanded coverage area being utilized, the first base station may signal to one or more UEs being served by neighboring base stations to direct the one or more UEs to detect the expanded coverage on the particular frequency provided by the first base station.

By way of example, a RAN may include base station A (BS A) and base station B (BS B) among various other entities that, in operation, provide wireless cellular connectivity to a group of UEs. BS A may be providing coverage to several UEs on a carrier frequency X, and BS B may be providing coverage to various UEs on carrier frequency X as well as on another carrier frequency Y. For load balancing purposes (e.g., to increase traffic in the coverage area on carrier frequency X of BS A and reduce traffic on BS B on carrier X during a particular time of day or event), BA A may determine it needs to expand its coverage on carrier frequency X, and may responsively do so.

Upon increasing its coverage area on carrier X, BS A may then determine that the increased coverage extends to the coverage area of BS B on carrier X, and in response to the determination, may message BS B indicating the expanded coverage. In response, BS B may direct one or more UEs being served by BS B to prioritize operating on carrier X instead of carrier Y in attempt to cause the one or more UEs to idle on carrier frequency X instead of carrier frequency Y. Causing the one or more UEs to idle on carrier frequency X may help ensure the one or more UEs detect the expanded coverage of carrier X provided by BS A, and may help facilitate handoffs of UEs being served by BS B to the expanded coverage area of BS A on carrier X.

Accordingly, disclosed in one respect is a method operable in a RAN. The method may be used to manage coverage area changes. The method may involve a first base station providing a first distance of coverage on a first carrier frequency and a second base station providing coverage on the first carrier frequency and on a second carrier frequency different than the first carrier frequency. The method may involve increasing the distance of coverage of the first base station to be a second distance of coverage greater than the first distance of coverage, and thereafter making a determination that the second distance of coverage extends to the coverage of the second base station on the first carrier frequency.

In response to determining that the second distance of coverage extends to the coverage of the second base station, the method may then involve causing one or more UEs being served by the second base station on the second carrier frequency to prioritize operating on the first carrier frequency of the second base station over operating on the second carrier frequency of the second base station.

Causing one or more UEs being served by the second base station to prioritize operating on the first carrier frequency over operating over the second carrier frequency may include causing the one or more UEs to prioritize idling on the first carrier frequency over idling on the second carrier frequency. To do so, the first base station may message or signal to the second base station requesting the change in priority. In response to the signaling, the second base station may broadcast a prioritization list, for receipt by the one or more UEs that ranks the first carrier frequency higher than the second carrier frequency.

Consequently, the method may help to ensure the one or more UEs originally served by the second base station on the second carrier frequency, idle on the first carrier frequency of the second base station instead of idling on the second carrier frequency of the second base station. Causing the UEs to idle on the first carrier frequency may facilitate detection of the extended coverage of the first base station on the first carrier frequency and may help effectuate a handoff.

In another respect, disclosed is a first base station configured for operation in a RAN to carry out the methods described herein. The first base station may provide a distance of coverage on a first carrier frequency and may include an antenna structure, a processor, and a data storage containing instructions executable by the processor for carrying out a set of functions. The set of functions may include decreasing a downward tilt of the antenna structure to increase the distance of coverage of the first base station to be a second distance of coverage that is greater than the first distance of coverage. In practice, a downward tilt of the antenna structure may be accomplished manually or via a controller.

The functions may also include making a first determination that the second distance of coverage extends to coverage of a second base station in the RAN. The second base station in the RAN may be providing coverage on the first carrier frequency and on a second carrier frequency and the second distance of coverage may extend to the coverage of the second base station on the first carrier frequency. The functions may additionally involve in response to determining the second distance of coverage extends to coverage of the second base station, causing one or more UEs being served by the second base station on the second carrier frequency to prioritize operating on the first carrier frequency over the second carrier frequency.

Still further, disclosed is a RAN in which the method described above can be implemented. The RAN may include a first base station configured to provide a first distance of coverage on a first carrier frequency and a second base station configured to provide coverage on the first carrier frequency and a second carrier frequency. The RAN may also include a RAN entity. The RAN entity may be configured to cause the first base station to increase the distance of coverage of the first base station to be a second distance of coverage greater than the first distance of coverage; make a first determination that the second distance of coverage extends to the coverage of the second base station on the first carrier frequency; and in response to the first determination, cause one or more UEs being served by the second base station on the second carrier frequency to prioritize operating on the first carrier frequency of over operating on the second carrier frequency.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

Various example embodiments are described herein with reference to the following drawings, in which like numerals denote like entities, and in which.

DETAILED DESCRIPTION

Figure 1:
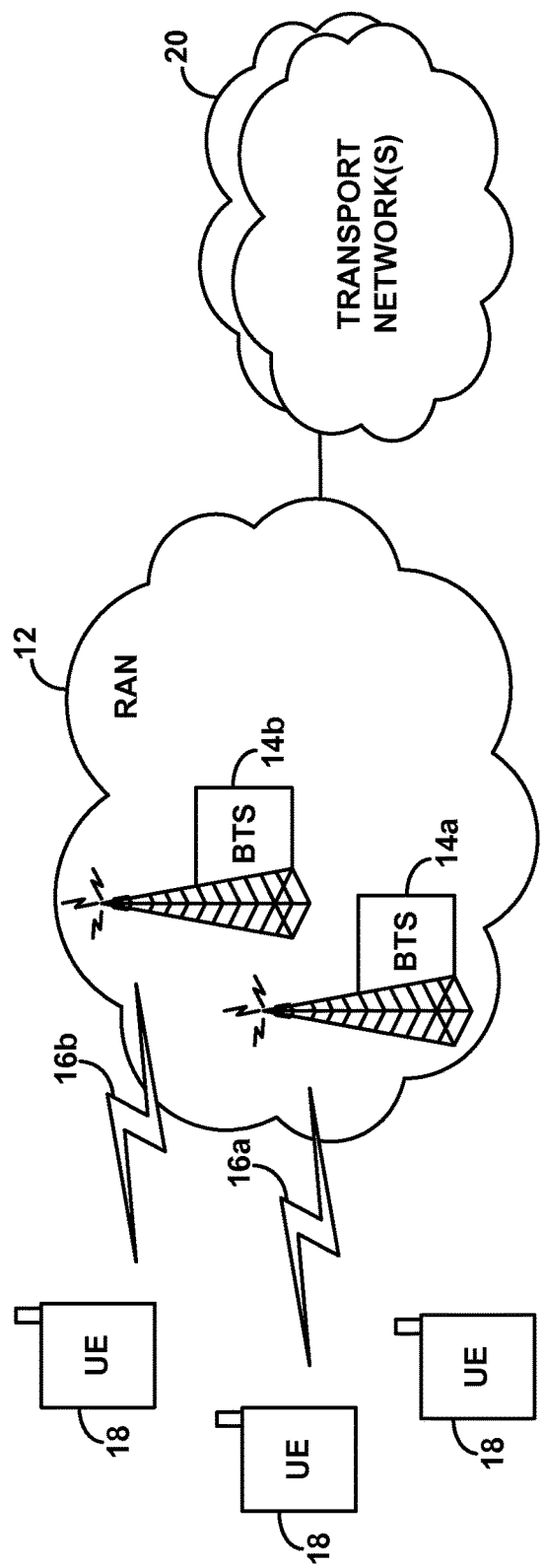
FIG. 1 is a simplified block diagram of a cellular wireless network in which the present method can be implemented.

Referring to the drawings, as noted above, FIG. 1 is a simplified block diagram of a cellular wireless network in which the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example wireless network as including at its core a RAN 12 having two base stations 14a and 14b that radiate to define wireless air interfaces 16a, 16b through which the base stations may communicate with one or more served UEs 18. In some embodiments, the two base stations 14a, 14b may be communicatively linked via an inter-base station link (not shown), and in other embodiments, the two base stations 14a, 14b may communicate with each other via a separate RAN entity to which the base stations are communicatively linked such as a base station controller (BSC). RAN 12 may then provide connectivity with one or more transport networks 20, such as the public switched telephone network (PSTN) or the Internet for instance. With this arrangement, a UE 18 that is positioned within coverage of one of the base stations and that is suitably equipped may engage in air interface communication with the base station and may thereby communicate with remote entities on the transport network(s) and/or with other UEs served by the RAN.

Figure 2:
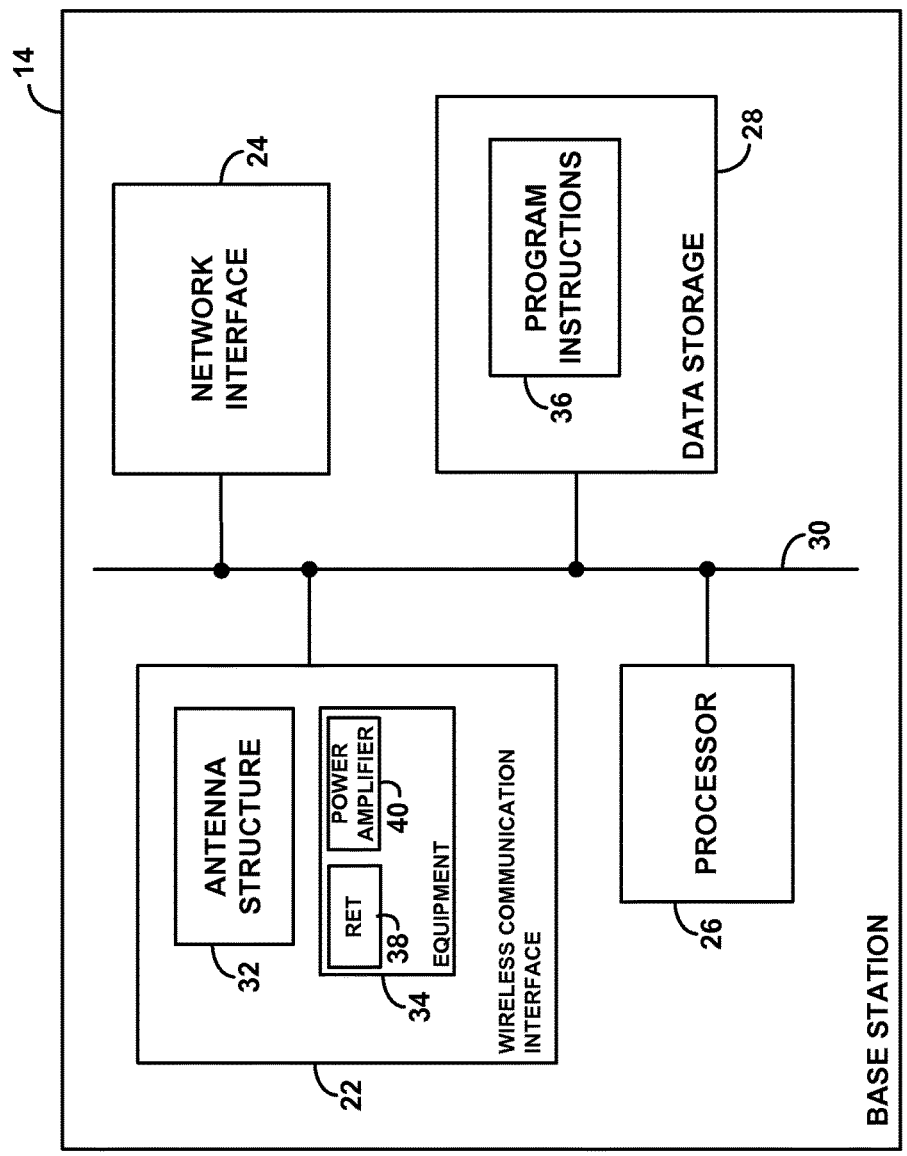
FIG. 2 is a simplified block diagram of a base station operable in the cellular wireless network of FIG. 1.

FIG. 2 is a simplified block diagram of a representative cellular base station 14, such as a base transceiver station, access node, access point, Node-B, or eNodeB, for instance (whether macro, femto or the like), illustrating some of the components that can be included in such an entity. As shown in FIG. 2, the representative base station 14 may include a wireless communication interface 22, a network interface 24, a processor 26, and data storage 28, all of which may be coupled together by a system bus, network or other connection mechanism 30.

As shown, wireless communication interface 22 may comprise an antenna structure 32 and associated equipment 34 that may include a remote-antenna tilt (RET) mechanism 38 and power amplifier 40. In some base station arrangements, the antenna structure 30 may be provided at the top of a base station tower, to facilitate providing broad coverage. RET mechanism 38 may then be configured to provide a downward tilt to the antenna structure to provide the broad coverage. Accordingly, in some arrangements, RET mechanism 38 may include an antenna mount or mounts rotatable by one or more servo motors. Further, in embodiments in which antenna structure 30 includes multiple antennas, each antenna of the antenna structure may be provided with a RET mechanism.

Antenna structure 30 may be arranged to exchange communications with the UEs 18 that are served by the base station 14, by transmitting and receiving communications over the air interfaces 16. Power amplifier 40 may be programmatically controllable, by the processor 26 for instance, to control the transmission power at which antenna structure 30 engages in particular transmissions, such as communication transmissions, for example. Processor 26 may then comprise one or more general purpose processors (e.g., microprocessors) and/or one or more special purpose processors (e.g., application specific integrated circuits). And as shown, data storage 28 may hold program instructions 36, which may be executable by processor 26 to control or carry out various base station functions described herein, such as to cause RET mechanism 38 to decrease a downward tilt of antenna structure 30 to expand a coverage area of base station 14, or to cause the antenna structure to transmit a pilot signal at a particular transmission power level for instance.

Network interface 24 may generally function to facilitate communication with the network infrastructure of FIG. 1 and may comprise a wired or wireless interface for communicating. As such, network interface 24 may take any suitable form for carrying out these functions. Example interfaces may include an Ethernet interface, a serial bus interface (e.g., Firewire, USB 2.0, etc.), a chipset and antenna adapted to facilitate wireless communication, and/or any other interface that provides for wired and/or wireless communication. Network interface 24 may also include multiple interfaces. Other configurations are possible as well.

In line with the discussion above, processor 26 programmed with instructions 36 may define part or all of a controller for controlling operation of the base station 14. Alternatively or additionally, however, such control functionality could be provided external to the base station 14, in another RAN entity such as a radio network controller (RNC), BSC, or mobility management entity (MME), for instance, which, as noted above, could be communicatively linked with the base station 14 and could serve to control aspects of base station operation and RAN operation generally.

Figure 3:
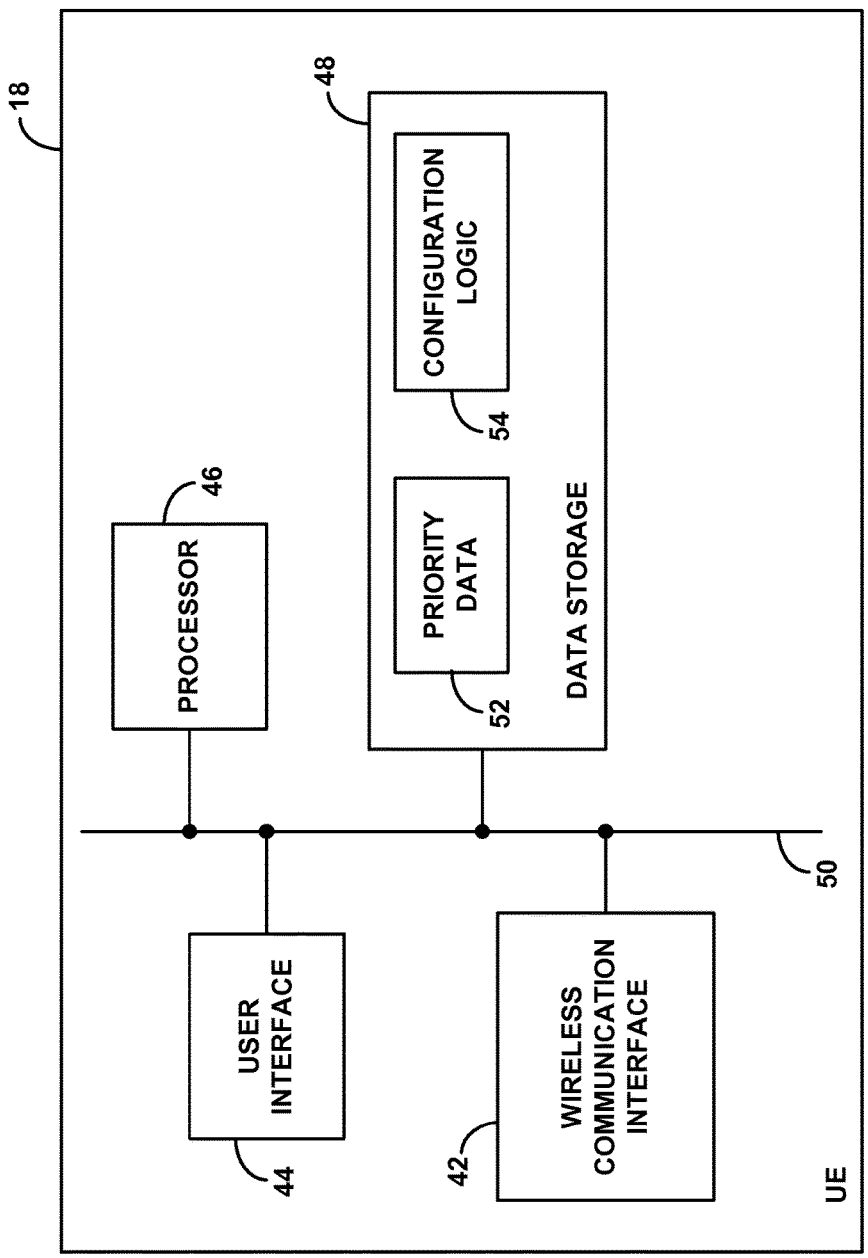
FIG. 3 is a simplified block diagram of a UE operable in the cellular wireless network of FIG. 1.

Referring next to FIG. 3, a simplified block diagram of an example UE 18 is shown, to help illustrate how such a device might operate in accordance with the present disclosure. The UE may be any of a variety of devices, whether or not technically operated by a "user." For example, and as noted above, the UE may be a cell phone, a tablet computer, a tracking device, an embedded wireless module, or any other wirelessly equipped communication device.

As shown in FIG. 3, example UE 18 includes a wireless communication interface 42, a user interface 44, a processor 46, and non-transitory data storage 48, all of which may be coupled together by a system bus, network, or other communication mechanism 50. These components may be housed within a unitary housing forming an outer shell of UE 18. In alternative embodiments, however, some or all of the components may be integrated together in some other manner.

In this arrangement, user interface 44 may function to facilitate user interaction with the UE if appropriate. Wireless communication interface 42 may enable UE 18 to communicate with an available cellular wireless network such as that of FIG. 1. To do so, wireless communication interface 42 may function to enable UE 18 to communicate over air interface 16 with one or more base stations 14, in accordance with an agreed air interface protocol such as one of those noted above for instance. As such, wireless communication interface 42 may include a chipset integrated with other UE components, such as user interface components or the like, all of which may be contained within the UE housing noted above.

Processor 46 may comprise one or more general purpose processors and/or one or more special purpose processors (e.g., digital signal processors) and may be integrated in whole or in part with wireless communication interface 42. Data storage 48 may comprise one or more volatile and/or non-volatile storage components, such as magnetic, optical, or flash storage, and may be integrated in whole or in part with processor 46, such as in the form of cache memory for instance.

As shown in FIG. 3, data storage 48 may also contain a set of cellular wireless network priority data 52. Priority data 52 may specify preferred carrier frequencies for a particular cellular wireless network. The preferred carrier frequencies may be established specifically for purposes of the present methods, such as to cause a UE to idle in an expanded coverage area on a particular frequency. For example, if UE 18 is idling on a given carrier frequency with low traffic channel resources, it may be appropriate for the base station serving UE 18 to direct UE 18 to prefer a different carrier frequency for idling. Alternatively, for example at a later time, if traffic channel resources become readily available on the given carrier frequency, it may be appropriate for the base station serving UE 18 to direct UE 18 prefer idling on the given carrier frequency. In addition to the priority data 52, data storage 48 may include a set of configuration logic 54, including program instructions and associated reference data, that processor 46 may use to carry out various functions described herein.

In one embodiment (not shown), the priority data takes the form of a prioritization list (PL), which specifies a set of available wireless networks and carriers and defines the priority order in which UE 18 should search for an available carrier for each network.

Figure 4:
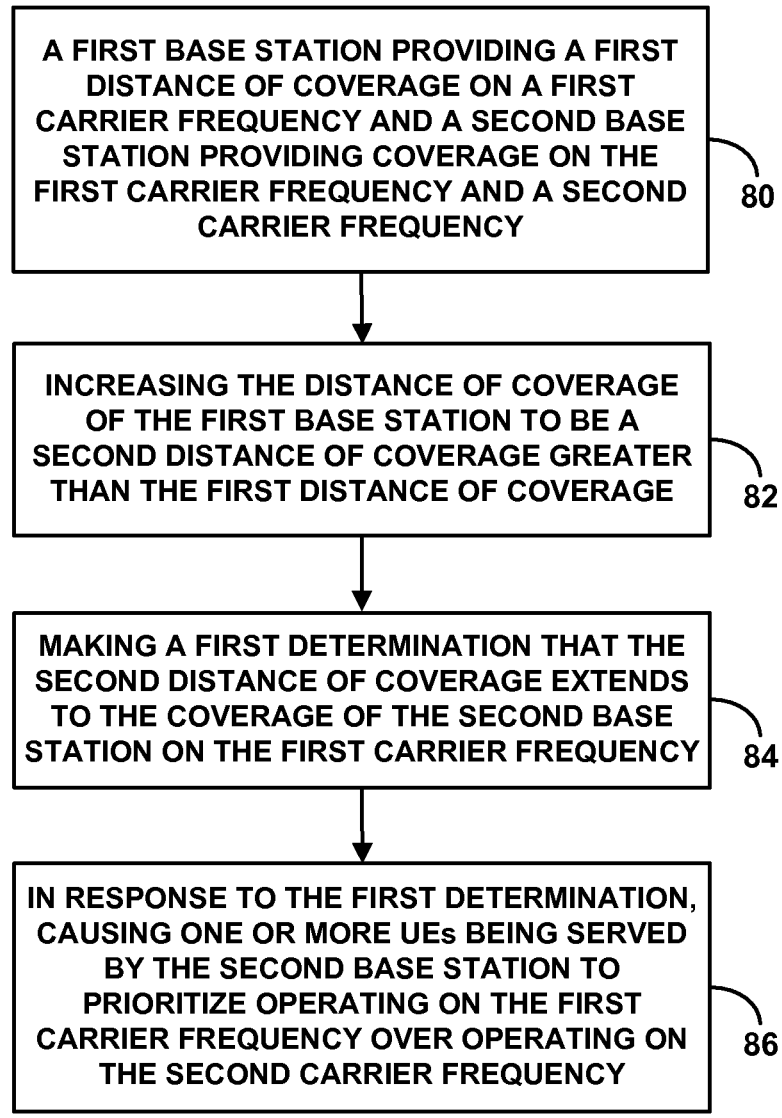
FIG. 4 is a flow chart of a method, according to an example embodiment.

FIG. 4 is illustrates a method for managing coverage area changes using base station signaling, according to an example embodiment. The method may be carried out by a cellular wireless network as shown in FIG. 1, such as by base station 14 or another entity of the RAN for instance. UEs operating in this method may be the same as UE 18, and may be configured to operate on a particular carrier frequency. As noted above, operating on a particular carrier frequency may include idling on the particular carrier frequency.

As shown in FIG. 4, at block 80, the method involves a first base station providing a first distance of coverage on a first carrier frequency. For instance, a base station such as base station 14a may provide a first distance of coverage to one or more UEs 18. The method also involves a second base station providing coverage on the first carrier frequency and on a second carrier frequency. For instance, base station 14b may provide a second distance of coverage to the remaining UEs 18 that are not being served by base station 14a. In practice, first base station 14a and second base station 14b may provide respective coverage areas concurrently.

At block 82, the method may include increasing the distance of coverage of the first base station to be a second distance of coverage greater than the first distance of coverage. Increasing the distance of coverage of the first base station may include increasing the distance of coverage on the first carrier frequency and may have been performed to balance the competing needs noted throughout this disclosure. For example, first base station 14a may radiate to define a coverage area that may include cells encompassing stadiums or other special-event venues, where the number of operating UEs may rise sharply during events, while remaining relatively low most of the time. Accordingly, first base station 14a may decrease a downward tilt of an associated antenna structure to increase the distance of coverage on the first carrier frequency during the day in attempt to make use of its available resources due to the low number of operating UEs.

At block 84, the method 400 involves making a first determination that the second distance of coverage extends to the coverage area of the second base station on the carrier frequency. For instance, in a cellular wireless network configured to operate according to a LTE protocol, first base station 14ba may determine that its expanded coverage area extends to a coverage area of second base station 14b. Alternatively, first base station 14a may communicate with other RAN entities to determine that its expanded coverage area extends to the coverage area of second base station 14b.

In response to determining that the expanded coverage of the first base station extends to the coverage of the second base station on the first carrier frequency, at block 86, the method involves causing one or more UEs being served by the second base station to prioritize operating on the first carrier frequency over operating on the second carrier frequency.

As noted above, causing one or more UEs being served by the second base station to prioritize operating on the first carrier frequency over operating over the second carrier frequency may include causing the one or more UEs to prioritize idling on the first carrier frequency over idling on the second carrier frequency. To do so, the first base station 14a may message or signal to the second base station 14b requesting the change in priority. In response to the signaling, the second base station 14b may broadcast a PL, for receipt by the one or more UEs 18 being served by base station 14b, that ranks the first carrier frequency higher than the second carrier frequency for operating.

In practice, first base station 14a may signal (e.g., using the X2 link) to second base station 14b to cause second base station 14b to broadcast to the one or more UEs 18 being served by the second base station 14b an idle mode mobility control (IMC) message to change idle mode priorities of the one or more UEs 18 being served by the second base station 14b. The IMC message may include a PL that lists the first carrier frequency higher than the second carrier frequency. Accordingly, in response to receiving the IMC message, the one or more UEs may prioritize idling on the first carrier frequency instead of the second carrier frequency.

In other examples, the one or more UEs being served by base station 14b may have a variety of different PLs. As such, base station 14b may transmit to the one or more UEs a directive for the one or more UEs to use a certain PL that ranks the first carrier frequency higher than the second carrier frequency. Similarly, in a further example, the one or more UEs being served by base station 14b may have a changeable PL, and base station 14b may transmit to the one or more UEs a directive instructing the one or more UEs 18 to alter the changeable PL in a manner such that the PL ranks the first carrier frequency higher than the second carrier frequency.

Further, in some examples second base station 14b may broadcast its IMC message to a certain subset of the one or more UEs 18 being served by the second base station 14b, such as UEs that may be reporting to base station 14b a channel quality indicator (CQI) less than a threshold value. Beneficially, the second base station 14b, may thereby cause UEs 18 that are reporting low CQIs to take advantage of the expanded coverage area, which may help ensure resources of the expanded coverage area are utilized, and address the needs of UEs 18 reporting low CQIs by allowing them to operate on a new carrier frequency that may be of better quality.

Exemplary embodiments have been described above. Those skilled in the art will understand, however, that changes and modifications may be made to these embodiments without departing from the true scope and spirit of the invention, which is defined by the claims.

We claim:

1. A method in a radio access network (RAN) comprising:
a first base station providing coverage on a first carrier frequency ("first base station's first-carrier coverage"), the first base station's first-carrier coverage having a first distance of coverage;
a second base station providing coverage on the first carrier frequency ("second base station's first-carrier coverage") and on a second carrier frequency ("second base station's second-carrier coverage");
increasing the distance of the first base station's first-carrier coverage to be a second distance of coverage greater than the first distance of coverage;
making a first determination that the increased, second distance of the first base station's first-carrier coverage extends to the second base station's first-carrier coverage; and
in response to the first determination, causing one or more UEs being served by the second base station to prioritize operating on the first carrier frequency over operating on the second carrier frequency.

2. The method of claim 1, wherein causing the one or more UEs being served by the second base station to prioritize operating on the first carrier frequency over operating on the second carrier frequency comprises causing the one or more UEs served by the second base station to prioritize idling on the first carrier frequency over idling on the second carrier frequency.

3. The method of claim 1, wherein increasing the distance of the first base station's first-carrier coverage comprises decreasing a downward antenna tilt of the first base station.

4. The method of claim 1, wherein increasing the distance of the first base station's first-carrier coverage is performed to facilitate load balancing.

5. The method of claim 1, wherein causing the one or more UEs to prioritize operating on the first carrier frequency over operating on the second carrier frequency comprises:
signaling from the first base station to the second base station; and
in response to the signaling, the second base station broadcasting a prioritization list, for receipt by the one or more UEs, that ranks the first carrier frequency higher than the second carrier frequency.

6. The method of claim 5,
wherein the first base station is communicatively linked with the second base station via an X2 link, and
wherein the signaling from the first base station to the second base station is performed via the X2 link.

7. The method of claim 1, wherein the RAN operates according to a Long-Term Evolution (LTE) wireless-communication protocol.

8. A first base station configured for operation in a radio access network (RAN), the first base station providing coverage on a first carrier frequency ("first base station's first-carrier coverage"), the first base station's first-carrier coverage having a distance of coverage, wherein the RAN further includes a second base station that provides coverage on the first carrier frequency ("second base station's first-carrier coverage") and that also provides coverage on a second carrier frequency ("second base station's second-carrier coverage"), the first base station comprising:
an antenna structure;
a processor; and
a data storage containing instructions executable by the processor for carrying out a set of functions including:
decreasing a downward tilt of the antenna structure to increase distance of the first base station's first-carrier coverage to be a second distance of coverage greater than the first distance of coverage,
making a first determination that the second distance of the first base station's first-carrier coverage extends to the second base station's first-carrier coverage, and
in response to the first determination, causing one or more UEs being served by the second base station to prioritize operating on the first carrier frequency over operating on the second carrier frequency.

9. The first base station of claim 8, wherein causing the one or more UEs being served by the second base station to prioritize operating on the first carrier frequency over operating on the second carrier frequency comprises causing the one or more UEs served by the second base station to prioritize idling on the first carrier frequency over idling on the second carrier frequency.

10. The first base station of claim 8, wherein decreasing the downward antenna tilt of the antenna structure to increase the distance of the first base station's first-carrier coverage to be the second distance of coverage greater than the first distance of coverage is performed to facilitate load balancing.

11. The first base station of claim 8,
wherein causing the one or more UEs to prioritize operating on the first carrier frequency over operating on the second carrier frequency comprises signaling from the first base station to the second base station.

12. The first base station of claim 11,
wherein the first base station is communicatively linked with the second base station via an X2 link, and
wherein the signaling from the first base station to the second base station is performed via the X2 link.

13. A radio access network (RAN) comprising:
a first base station configured to provide a first distance of coverage on a first carrier frequency ("first base station's first-carrier coverage");
a second base station configured to provide coverage on the first carrier frequency ("second base station's first-carrier coverage") and on a second carrier frequency ("second base station's second-carrier coverage");

a RAN entity configured to:
  cause the first base station to increase the distance of the first base station's first-carrier coverage to be a second distance greater than the first distance;
  make a first determination that the increased, second distance of the first base station's first-carrier coverage extends to the second base station's first-carrier coverage; and
  in response to the first determination, cause one or more UEs being served by the second base station to prioritize operating on the first carrier frequency over operating on the second carrier frequency.

14. The RAN of claim 13, wherein the RAN entity is further configured to cause the one or more UEs served by the second base station to prioritize idling on the first carrier frequency over idling on the second carrier frequency.

15. The RAN of claim 13, wherein the RAN entity is further configured to decrease a downward antenna tilt of the first base station to increase the first base station's first-carrier coverage.

16. The RAN of claim 13, wherein the RAN entity comprises the first base station.

17. The RAN of claim 13,
  wherein the RAN entity is further configured to cause the one or more UEs to prioritize operating on the first carrier frequency over operating on the second carrier frequency by causing the second base station to broadcast a prioritization list, for receipt by the one or more UEs, that ranks the first carrier frequency higher than the second carrier frequency.

18. The RAN of claim 17, wherein the RAN entity comprises the first base station, and wherein causing the second base station to broadcast the prioritization list that ranks the first carrier frequency higher than the second carrier frequency comprises the first base station signaling to the second base station.

* * * * *